United States Patent
Masser

(10) Patent No.: US 7,519,871 B2
(45) Date of Patent: Apr. 14, 2009

(54) PLUG-IN PROBLEM RELIEF ACTUATORS

(75) Inventor: Joel L. Masser, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 457 days.

(21) Appl. No.: 11/281,196

(22) Filed: Nov. 16, 2005

(65) Prior Publication Data

US 2007/0168719 A1  Jul. 19, 2007

(51) Int. Cl.
 *G06F 11/00* (2006.01)
(52) U.S. Cl. .......................... 714/48; 714/47
(58) Field of Classification Search ............... 714/48, 714/38, 37, 15, 47; 717/124, 125, 126, 141
See application file for complete search history.

(56) References Cited

U.S. PATENT DOCUMENTS

| | | | |
|---|---|---|---|
| 5,050,168 A * | 9/1991 | Paterson ...................... | 714/35 |
| 7,020,797 B2 * | 3/2006 | Patil .............................. | 714/4 |
| 7,028,225 B2 * | 4/2006 | Maso et al. .................... | 714/47 |
| 2003/0061265 A1 * | 3/2003 | Maso et al. .................. | 709/105 |
| 2004/0025088 A1 * | 2/2004 | Avvari et al. .................. | 714/38 |
| 2006/0200278 A1 * | 9/2006 | Feintuch ........................ | 701/3 |

* cited by examiner

*Primary Examiner*—Dieu-Minh Le
(74) *Attorney, Agent, or Firm*—Canady & Lortz LLP; Bradley K. Lortz

(57) ABSTRACT

Systems and methods for managing errors that occur in operating system and software applications are disclosed where plug-in problem relief actuators are employed. The plug-in problem relief actuators are small plug-in programs for dealing with software errors. A typical system utilizes a relief manager that loads and invokes one or more problem relief actuators from an available arsenal in response to a request. The initiating request may either be user-directed or automated through software. Operating parameters for a particular error and relief actuator are received from descriptor data storage and/or a user query. Generic problem relief actuators for signaling event completion, subtask termination, subtask resumption, resource release and reserved device release can be used in addition to other custom actuators. Employing such a modular error response system reduces down time and the likelihood of data corruption or loss for critical software and accelerates the problem resolution.

20 Claims, 7 Drawing Sheets

PLUG-IN PROBLEM RELIEF ACTUATORS

BACKGROUND OF THE INVENTION

1. Field of the Invention

This invention relates to computer systems and software applications. Particularly, this invention relates to computer systems and methods for managing and recovering from errors occurring in the operation of computer systems and software applications.

2. Description of the Related Art

Operating systems and applications occasionally encounter errors that can result in a software outage, entailing the inability to perform work for a period of time and sometimes resulting in lost or corrupted data. Software applications outages can be expensive for users and result in reduced customer satisfaction. When an error occurs that makes the system unable to perform work adequately, the typical practice is to restart the system or application, i.e. the user voluntarily incurs an outage. However, this is not a true solution, but merely a way to end the present error condition and usually the only remaining option to address the situation.

In addition, when such operating system or software application problems are detected, it is desirable to have a way to relieve the problem symptoms with minimal disruption. However, fixing the root cause of a problem that affects a mission-critical software application often takes a very long time. Because it can take weeks or months to determine the root cause and then more weeks or even months to develop and test corrective maintenance when a field problem with a software application occurs, people who manage mission-critical systems and applications live in fear of the type of problem that happens without warning and requires a restart because the vendor cannot quickly fix the problem and cannot provide an adequate circumvention. In the meantime, business-critical systems and application must continue to operate. Accordingly, a quick transition back to normal operation has high value.

In addition, although many modem sophisticated programming systems include error recovery functions, these functions are designed before the system is ever used. But, many unanticipated errors often occur in an end user environment. Thus, these error recovery functions do not accommodate many types of errors. In addition, enhancing the recovery routines of these systems often requires a full software development cycle. Time is a factor in dealing with software failures.

In view of the foregoing, there is a need in the art for systems and methods to deal with problems that lead to software outages. There is further a need for such systems and methods to reduce the likelihood of data loss or corruption resulting from a software outage. There is still further a need for such systems and methods to reduce the time that critical software is unavailable due to such errors. As detailed hereafter, these and other needs are met by the present invention as detailed hereafter.

SUMMARY OF THE INVENTION

Systems and methods for managing errors that occur in operating system and software applications are disclosed where plug-in problem relief actuators are employed. The plug-in problem relief actuators are small plug-in programs for dealing with software errors. A typical system utilizes a problem relief manager that loads and invokes one or more problem relief actuators from an available arsenal in response to a request. The initiating request may either be user-directed or automated through software. Operating parameters for a particular error and relief actuator are received from descriptor data storage and/or a user query. Generic problem relief actuators for actions such as signaling event completion, subtask termination, subtask resumption, resource release and reserved device release can be used in addition to other custom actuators. Employing such a modular error response system reduces down time and the likelihood of data corruption or loss for critical software and accelerates the problem resolution.

A typical embodiment of the invention comprises a computer program embodied on a computer readable medium including program instructions for receiving a request including identification of a requested relief actuator, program instructions for reading descriptor data for the requested relief actuator and program instructions for invoking the requested relief actuator according to the operating parameters and the environment specifications The descriptor data includes operating parameters and environment specifications and the requested relief actuator comprises one of a plurality of available relief actuators for mitigating a software error. The request may be received from a user or from an error detection monitor such that the request is automated. Typically, program instructions are also included for validating the operating parameters. The plurality of available relief actuators may be managed through a standard software interface.

In some embodiments, the plurality of available relief actuators for mitigating a software error comprises functions including event completion signaling, subtask termination, subtask resumption, resource release and reserved device release. Additional and specialized relief actuators can also be readily developed and added to an available library of plug-in relief actuators.

Further embodiments can include program instructions for querying a user for any additional operating parameters that are also applied in loading and invoking the requested relief actuator and/or program instructions for reporting completion of operation of the requested relief actuator. Furthermore, the software monitor can include error prediction. Still further embodiments can include program instructions for recording the request in a system log. In addition, completion of the operation of the requested relief actuator can be added to the system log.

A typical method embodiment of the invention includes receiving a request including identification of a requested relief actuator, reading descriptor data for the requested relief actuator, the descriptor data including operating parameters and environment specifications, loading and invoking the requested relief actuator according to the operating parameters and the environment specifications and reporting completion of operation of the requested relief actuator. The requested relief actuator comprises one of a plurality of available relief actuators for mitigating a software error. The method can be further modified consistent with the program embodiments.

BRIEF DESCRIPTION OF THE DRAWINGS

Referring now to the drawings in which like reference numbers represent corresponding parts throughout.

DETAILED DESCRIPTION OF THE PREFERRED EMBODIMENT

1. Overview

There are generic types of software errors for which recovery is possible, permitting the disruption to be contained within the failing unit of work. Therefore, an application-wide or system-wide outage is not required, minimizing any data loss or corruption. For example, a software transaction that has exclusive control of a critical system resource may hang. No other software transaction can progress because the hung software transaction never releases the resource. Thus, the entire application or system is frozen and must be restarted. In accordance with the present invention, plug-in problem relief Actuators provide a way to cancel the hung transaction and without destroying all the waiting transactions.

A typical embodiment of the present invention utilizes a relief manager, relief actuator descriptors and relief actuators, which are small software programs for mitigating a software error. Certain standard actuators may be initially provided and additional actuators can be created and plugged-in as necessary to address specific types of software errors that arise later. Accordingly, new actuators can be developed by both the application developer as well as the application users. The task of developing a new actuator is simplified by the architecture of the actuator system because the actuators plug into the standard user interfaces and system interfaces provided by the relief manager system. The relief manager may be launched manually by a user or through use of an error detection/prediction system component. Operation of various embodiments of the invention is detailed hereafter.

2. Hardware Environment

Figure 1A:
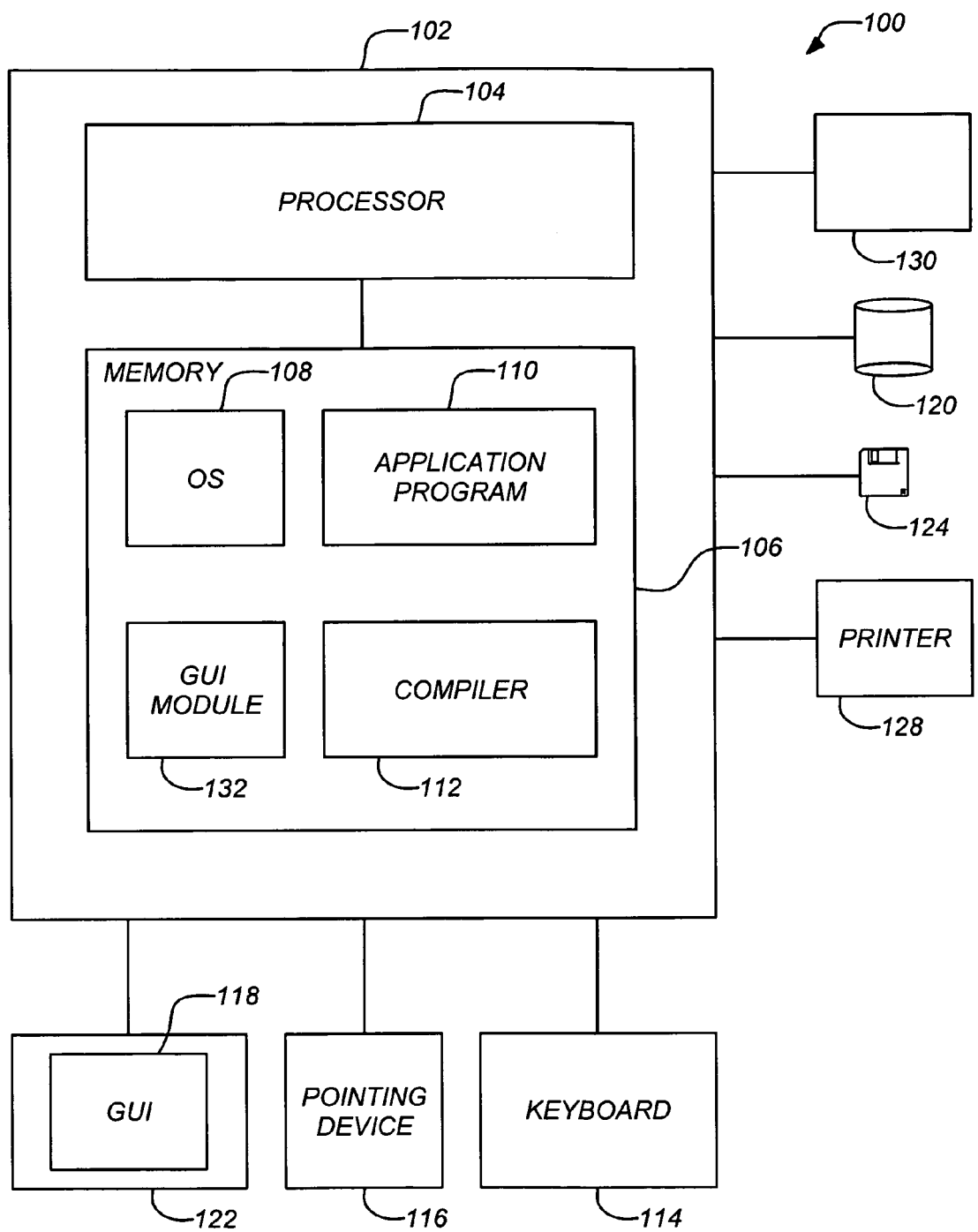
FIG. 1A illustrates an exemplary computer system that can be used to implement embodiments of the present invention.

FIG. 1A illustrates an exemplary computer system 100 that can be used to implement embodiments of the present invention. The computer 102 comprises a processor 104 and a memory 106, such as random access memory (RAM). The computer 102 is operatively coupled to a display 122, which presents images such as windows to the user on a graphical user interface 118. The computer 102 may be coupled to other devices, such as a keyboard 114, a mouse device 116, a printer, etc. Of course, those skilled in the art will recognize that any combination of the above components, or any number of different components, peripherals, and other devices, may be used with the computer 102.

Generally, the computer 102 operates under control of an operating system 108 (e.g. z/OS, OS/2, LINUX, UNIX, WINDOWS, MAC OS) stored in the memory 106, and interfaces with the user to accept inputs and commands and to present results, for example through a graphical user interface (GUI) module 132. Although the GUI module 132 is depicted as a separate module, the instructions performing the GUI functions can be resident or distributed in the operating system 108, a computer program 110, or implemented with special purpose memory and processors.

The computer 102 also implements a compiler 112 which allows one or more application programs 110 written in a programming language such as COBOL, PL/1, C, C++, JAVA, ADA, BASIC, VISUAL BASIC or any other programming language to be translated into code that is readable by the processor 104. After completion, the computer program 110 accesses and manipulates data stored in the memory 106 of the computer 102 using the relationships and logic that was generated using the compiler 112. The computer 102 also optionally comprises an external data communication device 130 such as a modem, satellite link, ethernet card, wireless link or other device for communicating with other computers, e.g. via the Internet or other network.

In one embodiment, instructions implementing the operating system 108, the computer program 110, and the compiler 112 are tangibly embodied in a computer-readable medium, e.g., data storage device 120, which may include one or more fixed or removable data storage devices, such as a zip drive, floppy disc 124, hard drive, DVD/CD-rom, digital tape, etc., which are generically represented as the floppy disc 124. Further, the operating system 108 and the computer program 110 comprise instructions which, when read and executed by the computer 102, cause the computer 102 to perform the steps necessary to implement and/or use the present invention. Computer program 110 and/or operating system 108 instructions may also be tangibly embodied in the memory 106 and/or transmitted through or accessed by the data communication device 130. As such, the terms "article of manufacture," "program storage device" and "computer program product" as may be used herein are intended to encompass a computer program accessible and/or operable from any computer readable device or media.

Embodiments of the present invention are generally directed to any software system or application program 110 that includes functions for mitigating damage resulting from a software error of the same or another software system or application. The program 110 may operate within a single computer 102 or as part of a distributed computer system comprising a network of computing devices. The network may encompass one or more computers connected via a local area network and/or Internet connection (which may be public or secure, e.g. through a VPN connection).

Figure 1B:
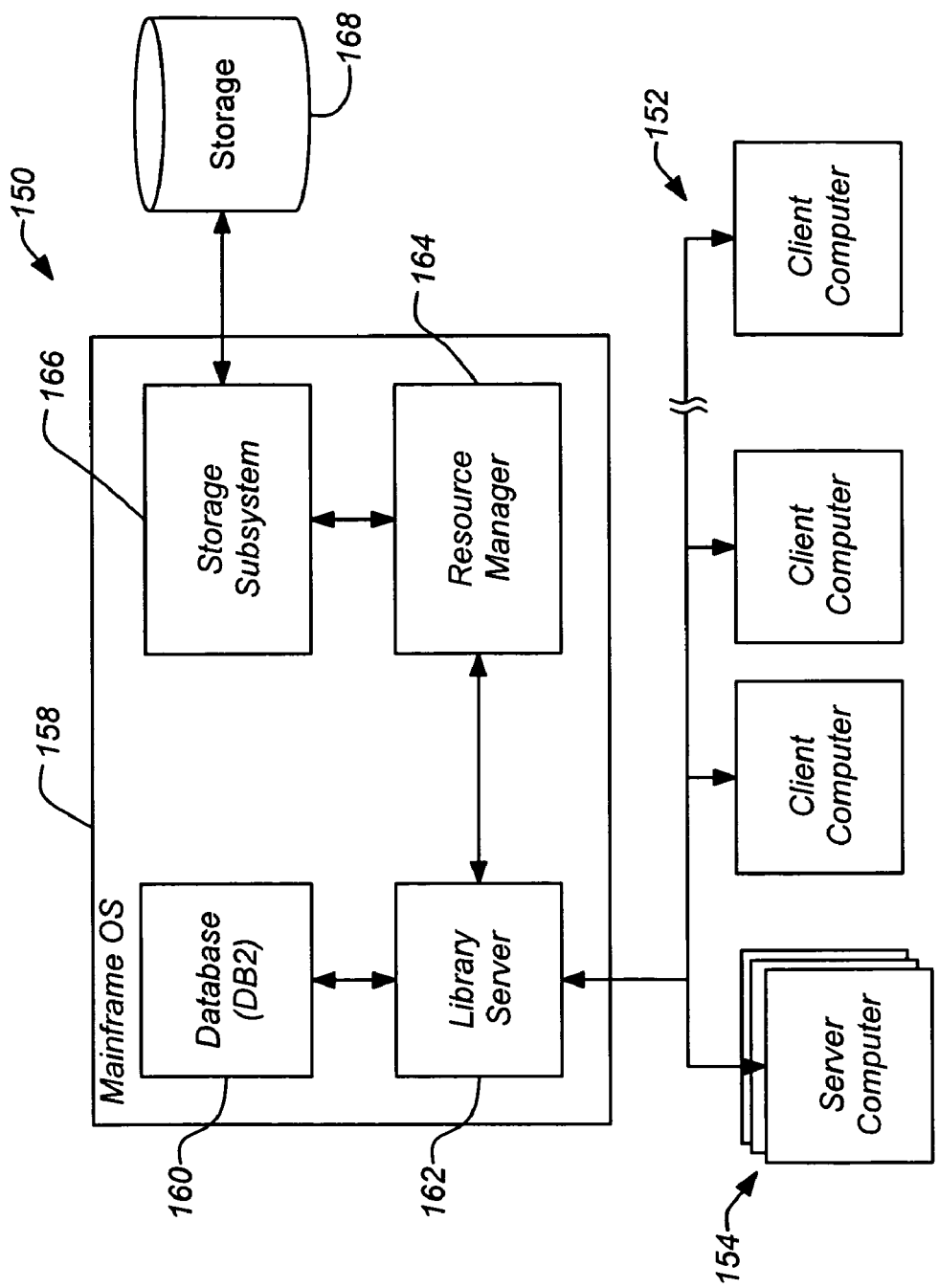
FIG. 1B illustrates a typical distributed computer system which may be employed in an typical embodiment of the invention.

FIG. 1B illustrates a typical distributed computer system 150 which may be employed in an typical embodiment of the invention. Such a system 150 comprises a plurality of computers 102 which are interconnected through respective communication devices 130 in a network 152. The network 152 may be entirely private (such as a local area network within a business facility) or part or all of the network 152 may exist publicly (such as through a virtual private network (VPN) operating on the Internet). Further, one or more of the computers 102 may be specially designed to function as a server or host 154 facilitating a variety of services provided to the remaining client computers 156. In one example one or more hosts may be a mainframe computer 158 where significant processing for the client computers or attached devices 156 may be performed. The mainframe computer 158 may comprise a database 160 which is coupled to a library server 162 which implements a number of database procedures for other networked computers 102 (servers 154 and/or clients 156). The library server 162 is also coupled to a resource manager 164 which directs data accesses through storage subsystem 166 facilitates accesses to one or more coupled storage devices 168 such as direct access storage devices (DASD) optical storage and/or tape storage. Various known access methods (e.g. VSAM, BSAM, QSAM) may function as part of the storage subsystem 166.

Those skilled in the art will recognize many modifications may be made to this hardware environment without departing from the scope of the present invention. For example, those skilled in the art will recognize that any combination of the above components, or any number of different components, peripherals, and other devices, may be used with the present invention meeting the functional requirements to support and implement various embodiments of the invention described herein.

3. Plug-in Problem Relief Actuators

As previously mentioned, embodiments of the invention are directed to systems and methods for managing errors that occur in operating system and software applications employing plug-in problem relief actuators. The plug-in problem relief actuators are small plug-in programs for dealing with software errors. A typical system utilizes a relief manager that loads and invokes one or more problem relief actuators from an available arsenal in response to a request. The initiating request may either be user-directed or automated through software. Operating parameters for a particular error and relief actuator are received from descriptor data storage and/or a user query. Generic problem relief actuators for actions such as signaling event completion, subtask termination, subtask resumption, resource release and reserved device release can be used in addition to other custom actuators.

Figure 2:
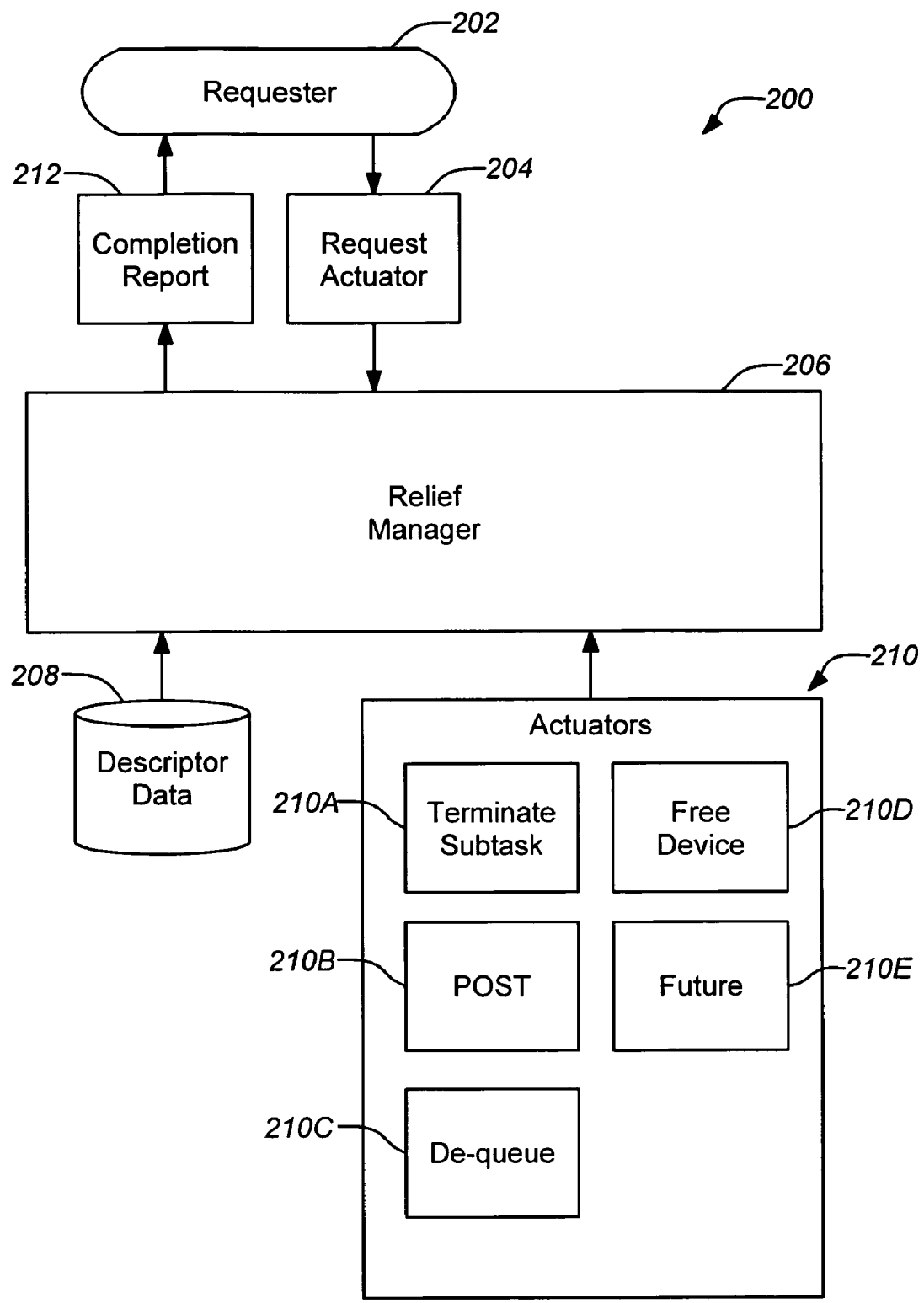
FIG. 2 is a functional block diagram of an exemplary embodiment of the invention.

FIG. 2 is a functional block diagram of an exemplary embodiment of the invention. The software system 200 can be implemented within a hardware environment as previously described in FIGS. 1A and 1B. The system 200 begins with a relief actuator request 204 that invokes the relief manager 206. The request 204 identifies a particular relief actuator to be used. For example, the request can originate with a user, providing the name of the desired relief actuator to an input form or menu in response to an error occurring in a software application of interest. Alternately, the request can originate from an automated monitoring program that monitors the running application for errors and invokes an appropriate relief actuator with a proper request 204 directed to the relief manager 206. The requested relief actuator is selected from a library 210 of available relief actuators, each designed to function in a specific manner to address different software errors. For example, relief actuators can be provided for terminating a subtask 210A, POST function 210B, de-queueing operations 210C, freeing devices/resources 210D as well as future relief actuators 210E (e.g. specialty functions). The specific functions of these example relief actuators will be further described hereafter.

Upon activation, the relief manager 206 reads descriptor data 208 for the requested relief actuator. The descriptor data 208 includes specification of the environment and parameters required to execute the requested relief actuator. In addition, the relief manager 206 may also prompt the requester 202 (e.g. the user) for additional operating parameters for the requested relief actuator. The relief manager 206 also may validate the operating parameters (from the descriptor data 208 as well as those from the requester 202). In addition, the relief manager 206 can record the relief actuator request 204 (including the operating parameters) in a system log. The system log can provide crucial audit trail information.

Finally, the relief manager 206 loads and invokes the requested relief actuator in the manner specified by the descriptor data 208 (as well as any additional input from the requester 202). The relief actuators are pluggable through a use of dynamic loading. Upon completion of operation of the requested relief actuator, the relief manager 206 then reports completion to the requester. Furthermore, the results may also be added to the system log to provide more crucial audit trail information.

Figure 3:
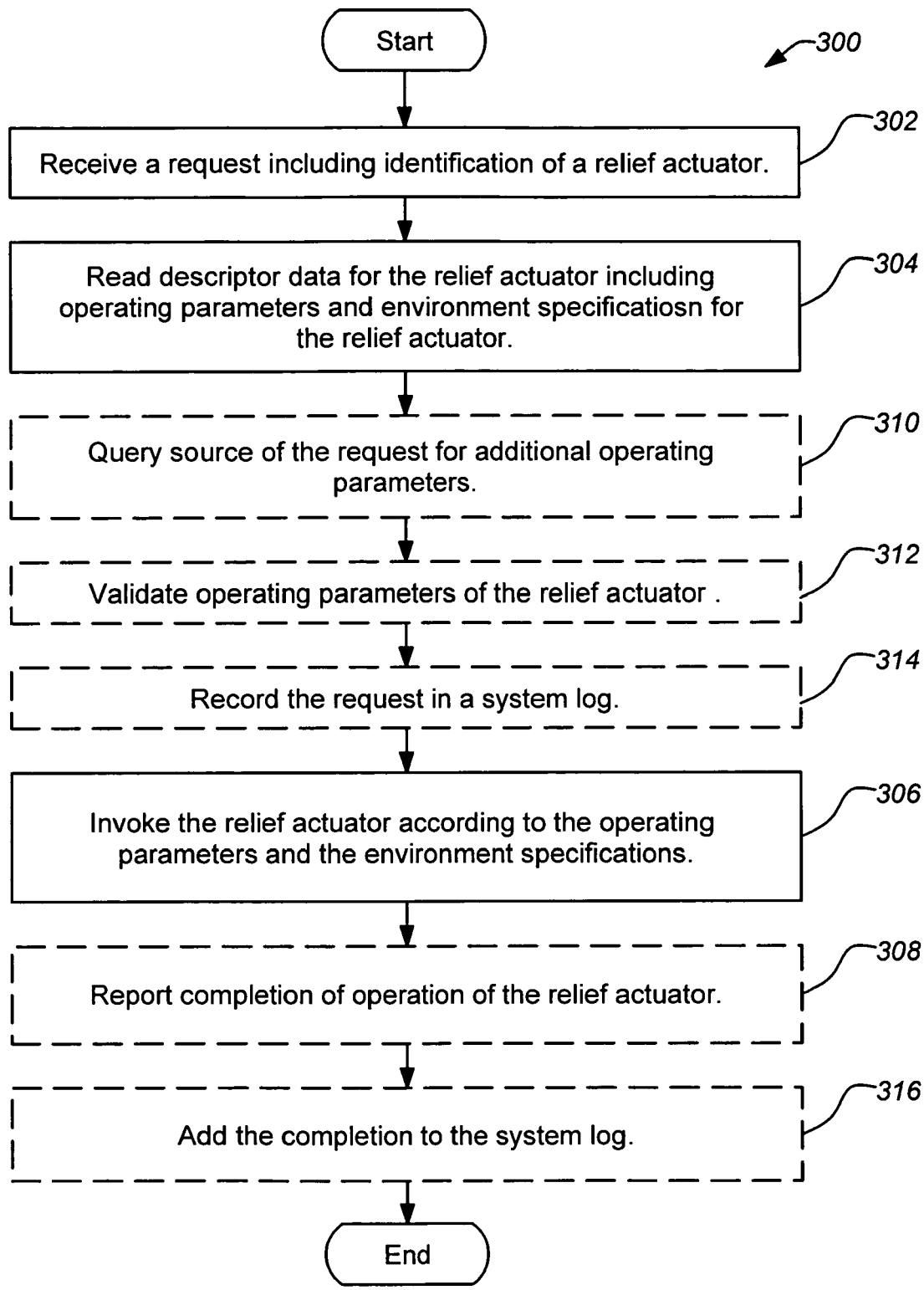
FIG. 3 is a flowchart of an exemplary method embodiment of the invention.

FIG. 3 is a flowchart of an exemplary method 300 embodiment of the invention. The method 300 begins with receiving a request including identification of a requested relief actuator in operation 302. Next in operation 304, descriptor data is read for the requested relief actuator. The descriptor data includes operating parameters and environment specifications. In operation 306, the requested relief actuator is invoked according to the operating parameters and the environment specifications. As previously described, the requested relief actuator comprises one of a plurality of available relief actuators for mitigating a software error.

The method 300 can further include some optional operations (identified in dotted outline in FIG. 3). For example, in operation 308 completion of the operation of the requested relief actuator is reported (to the request source, e.g. a user or error monitoring application). In operation 310 the source of the request is queried for additional operating parameters. These additional operating parameters are also applied in loading and invoking the requested relief actuator. Furthermore, in optional operation 312, operating parameters of the requested relief actuator are validated. Although other types of parameter validation are possible, a typical validation operation checks the syntax, e.g. length and format, of a given parameter. For example, a memory address may be required to be eight hexadecimal digits; the system checks that the memory address provided as an operating parameter meets this requirement. Operation 314 may be implemented to record the request in a system log. Similarly, in operation 316 the completion (i.e. the results) of the requested relief actuator may be added to the system log. In addition, the method 300 can be further modified consistent with the program embodiments.

In one example, embodiments of the present invention employing plug-in problem relief actuators can provide an architecture and implementation for the z/OS operating system of this function. This can permit a disruption to be contained within the failing unit of work, and therefore prevent an application-wide or system-wide outage and minimize any data loss or corruption.

For example, a transaction that has exclusive control of a critical system resource may hang. No other transaction can progress because the halted transaction never releases the resource. Consequently, the entire application or system is frozen and must be restarted in order to eliminate the problem. In another example, a task may be terminated abnormally because of an error. In yet another example, the processing to clean up after a primary failure may also fail, leaving a critical resource allocated to a task that will never run again. A relief actuator may be used to release the resource on behalf of the failed process and allow other waiting work to proceed, delayed but not disrupted.

Relief actuators may be one component of a real-time service aid or may be integrated into an autonomic system. In either case, the application includes problem prediction, detection, isolation, and relief components. Thus, relief actuators may be either invoked manually or automatically by an error detection or prediction system component.

In one specific example, the isolation and relief components can be implemented for z/OS in a z/OS problem determination and relief (ZDR) tool. The ZDR tool is a scalable, robust problem diagnosis and relief tool providing facilities for navigating and viewing storage, formatting control blocks, displaying component-specific data, displaying maintenance data, and relieving certain types of problems.

The real-time problem determination and relief component design is open so that as new types of problems are encountered, new relief actuators can be developed quickly and easily and hot-plugged into the system.

The relief actuator system architecture comprises a relief manager, relief actuator descriptors, and relief actuators, which are small plug-in programs. The typical system includes certain generic actuators and additional actuators can be created quickly and plugged-in as necessary. Software application developers, independent software vendors, hardware manufacturers, operating system developers, and end users can all create new actuators. Developing a new actuator is simplified because the modular actuators plug into the built-in user and system interfaces, e.g. provided by the relief manager.

In one example, generic actuators for z/OS operating system include signaling event completion, terminating a subtask, resuming a subtask, releasing held resources, and freeing a reserved device. These actuators can be used in a software environment to clear loop and hang conditions. A terminate subtask actuator (e.g. CALLRTM) can be employed to terminate and/or resume a subtask. Similarly, a signal event completion (e.g. POST) actuator can be provided. The POST actuator may be used to signal the completion of events such that other tasks that may be waiting for an Event Control Block (ECB) will become available for execution. The free device actuator can be used to clean up after recovery failures. In addition, a close/unallocate file actuator can be implemented. Resource management functions can also be implemented with release lock/latch resource actuators, e.g. SETLOCK, DEQUEUE. Some examples of other actuator functions include free memory, data space recycling and drive exit routines, e.g. a garbage collector program for deleting data no longer needed. In the z/OS example, ZDR also may employ two component-specific actuators for VSAM, e.g. ENDREQ and TERMRPL. These example specialized actuators are described hereafter.

The terminate subtask (or thread) actuator performs function well known in the art. This is the most basic actuator. Most systems already employ such a function, however, without being in the context of a pluggable relief actuator system.

An example of a resume subtask or signal event completion (POST in Z/OS) actuator can be illustrated as follows. If task A is responsible for resuming a suspended task B at an appropriate time but fails before performing the RESUME operation, then task B will never run. To remedy this situation, it is typically necessary to restart the entire application. However, if the user had a way to determine that the requirements for task B to continue were met and could manually issue a RESUME, the user could avoid the outage. A resume subtask or signal event completion actuator performs this function.

A free device actuator can perform the following functions. In one example in z/OS, if a process fails after reserving an I/O device, the recovery routine should normally free the device. But a failure in the recovery routine will leave the device unusable until the application is brought down. An actuator that issues a z/OS dynamic allocation request for unallocation may be written and used to clean up such device allocations when the recovery routine fails.

The close/unallocate file actuator may be used when an application encounters an error on one of many open files. The recovery routine may try to close and unallocate the file and then reopen it. However, sometimes the nature of the error prevents the recovery action from functioning properly. A manual retry of the recovery action may be successful. The unallocate actuator may thus be used to clean up residual allocations.

A free memory actuator may be employed if the system runs out of memory. In this situation, there is usually no way to free storage except by terminating processes that have acquired memory but failed to release it when it is no longer needed. It is useful to have a way to free the memory without taking down whole application. In a worst case scenario, an application may assign system ownership to storage it has allocated. In this case, without an actuator to free the storage that is no longer needed, the entire system must normally be recycled. For example, a user may be able to identify storage areas that are allocated but no longer needed. In this case, in the z/OS environment for example, an actuator may issue a FREEMAIN macro with parameters provided by the user, such as starting address, length, and subpool number.

A drive asynchronous exit routine actuator, e.g. a "garbage collector," can operate as a catch-all function. In certain respects, this actuator is a generalization of the freeing memory function previously described. Other resources besides memory may be acquired and frozen by a failure. If a process has a garbage collection routine, invoking it manually may enable other processes to run.

In one particular example, the VSAM, a z/OS data access method may employ two specific actuators, one for TERMRPL and one for ENDREQ. VSAM provides these two functions for releasing resources. TERMRPL is intended for use in a recovery routine when a task is terminating but owns VSAM resources such as buffers or request strings. TERMRPL returns these objects to the appropriate free pools. ENDREQ is intended for use in normally terminating a series of requests, such as a sequential browse sequence. ENDREQ ensures that all I/O is complete and gives up shared use of buffers. In the course of analyzing many VSAM problems, it has become apparent that being able to issue a TERMRPL or ENDREQ manually would provide symptomatic relief for many hang and looping situations. The actuators for these functions have been used in a test environment to clear loop and hang conditions. This process of generalizing failure types to discern appropriate actuators for development may be applied in the identification of new actuators for specific applications as will be understood by those skilled in the art.

Some other example z/OS oriented actuators may release a lock or latch or issue a DEQUEUE to release a resource. Another actuator may recycle a data space without needing to recycle the owning address space. Embodiments of the invention encompass a general framework for quickly addressing application errors before a complete solution can be determined and implemented.

Figure 4A:
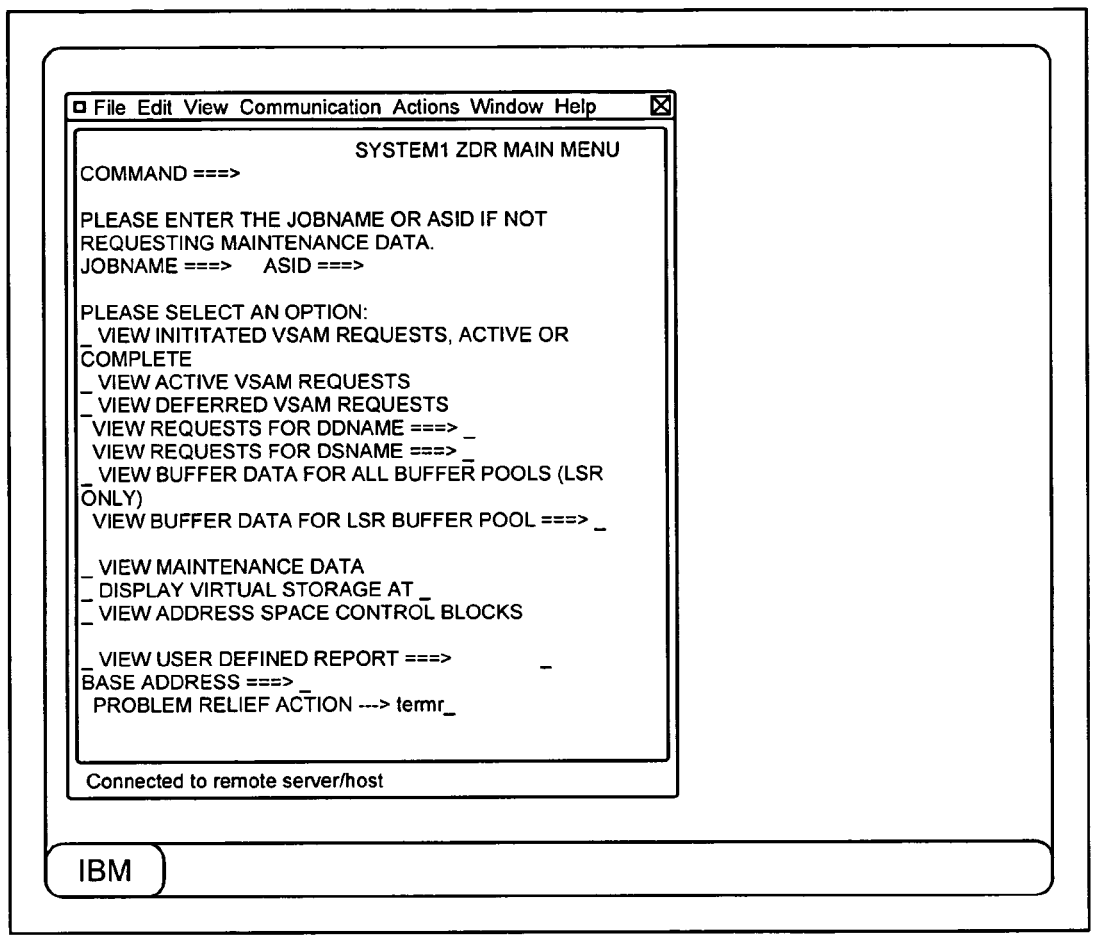
FIG. 4A illustrates an exemplary sample problem determination and relief menu.
Figure 4B:
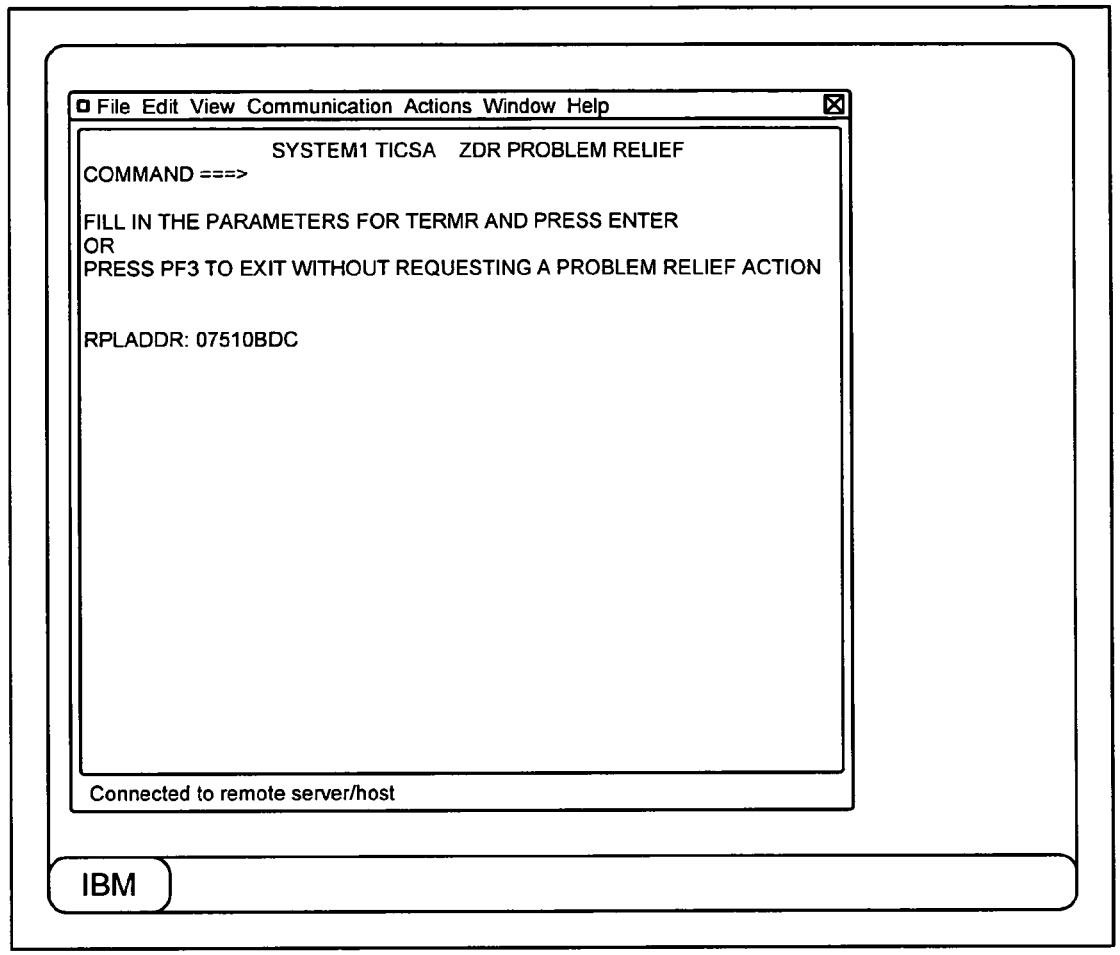
FIG. 4B illustrates an exemplary prompt for problem relief parameters.

FIG. 4A illustrates an exemplary sample problem determination and relief menu and FIG. 4B illustrates an exemplary prompt for problem relief parameters. In this example, a user has requested the problem relief action named "TERMR." As shown, after the user enters the name of the actuator to be invoked, the relief manager reads the actuator's descriptor and formats a screen prompting for the needed parameters. In this example, the user has entered a value for the single parameter RPLADDR. The screen text also reminds the user of the system name, job name, and actuator name that are involved.

Once the user has input the parameters and the relief manager has validated them, the actuator is invoked. The manager can then issue two messages, one describing what was performed by the actuator and identifying the user and another identifying the result of the process. For example, the following messages may be issued by a relief manager.

ZDR001I RELIEF ACTUATOR TERMR REQUESTED BY USER FOR ASID=0025
ZDR002I TERMR PROBLEM RELIEF ACTION COMPLETE,RC=00000000

The following is an example of an actuator descriptor where the applicable source code may comprise a single macro statement.

TERMR ZDRRELF PGM=ZDRTERMR,MODE=SRB, PARMS=(RPLADDR,4,X)

The macro expands to a set of constants that are loaded at run-time. The set of constants describe the input and execution mode of the particular actuator program.

```
TERMR   CSECT
    DC  CL8'ZDRTERMR'    RELIEF ROUTINE
    DC  CL3'SRB'         SRB OR TCB MODE
    DC  AL1(4)           FIELD LENGTH
    DC  C'X'             DATA TYPE X OR C
    DC  AL1(6)           FIELD LABEL LENGTH - 1
    DC  C'RPLADDR'       FIELD LABEL
    DC  C'END'           END OF DATA
```

Figure 4C:
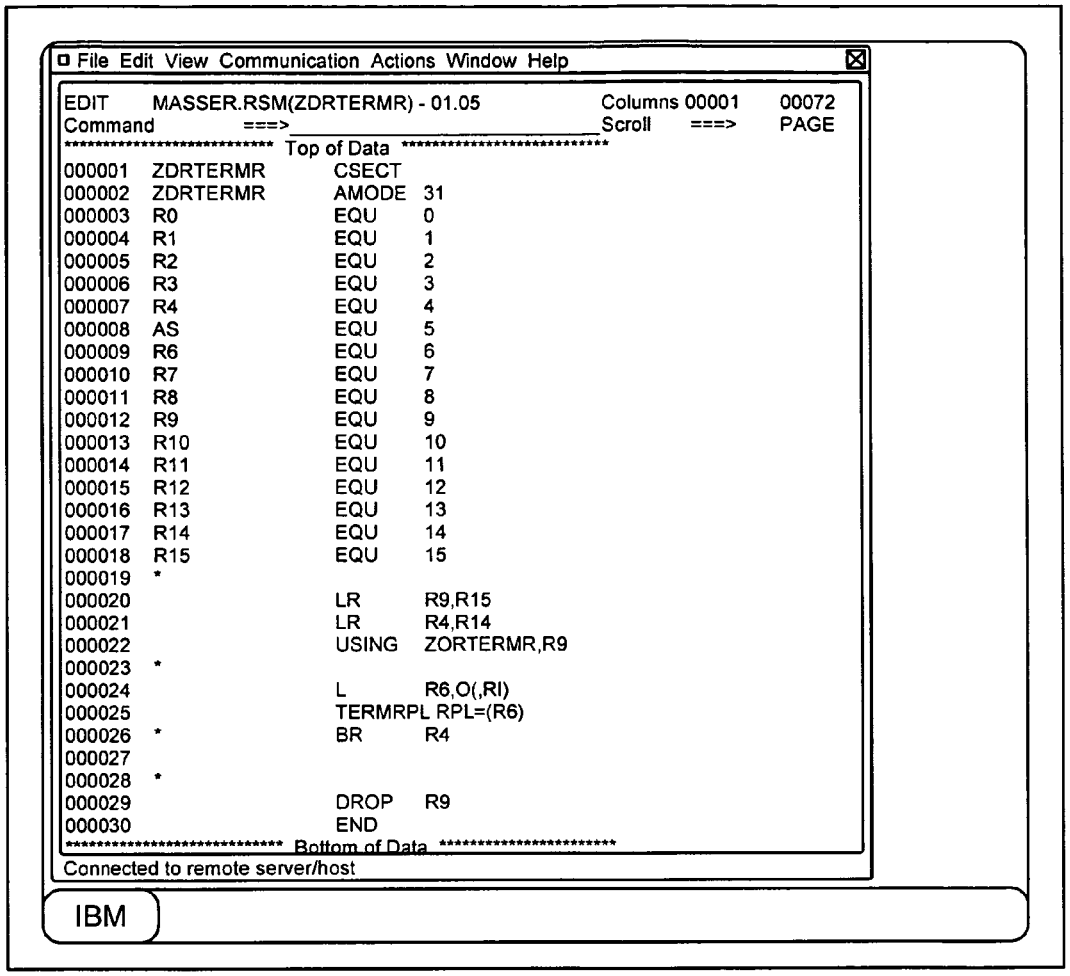
FIG. 4C illustrates an exemplary actuator program.

FIG. 4C illustrates an exemplary actuator program. Similar programs can be readily developed and utilized as plug-in actuator programs through a relief manager in accordance with the invention as previously described. The program name is the same as the "PGM=" parameter in the descriptor. The actuator program may be simply a vehicle for issuing the needed system service using the appropriate input parameters. On line 1 the program name is declared. On line 2 the program address mode is declared. On lines 3-18 constants are defamed for referring to hardware registers. On line 20, the entry point address of the actuator program is copied for use as a program base register. On line 21, the address for returning to the caller, i.e. relief manager, is saved. Line 24 copies the input parameter for use by the TERMRPL service. Line 25 invokes the TERMRPL service, passing the parameter. Finally, line 27 returns to the relief manager. Various modifications may be made to the foregoing exemplary actuator program as will be understood by those skilled in the art.

This concludes the description including the preferred embodiments of the present invention. The foregoing description including the preferred embodiment of the invention has been presented for the purposes of illustration and description. It is not intended to be exhaustive or to limit the invention to the precise forms disclosed. Many modifications and variations are possible within the scope of the foregoing teachings. Additional variations of the present invention may be devised without departing from the inventive concept as set forth in the following claims.

What is claimed is:

1. A computer program embodied on a computer storage medium executed by a processor for managing errors that occur in a running application where plug-in problem relief actuators are employed, comprising:
    program instructions for receiving a request including identification of a requested relief actuator made in response to an error occurring in the running application on one or more computers;
    program instructions for reading descriptor data for the requested relief actuator, the descriptor data including operating parameters and environment specifications; and
    program instructions for invoking the requested relief actuator according to the operating parameters and the environment specifications;
    wherein the requested relief actuator comprises one of a plurality of available relief actuators, each comprising a small plug-in program for mitigating a different software error in the running application on the one or more computers.

2. The computer program of claim 1, wherein the plurality of available relief actuators, each for mitigating the different software error comprises one or more functions selected from the group consisting of event completion signaling, subtask termination, subtask resumption, resource release and reserved device release.

3. The computer program of claim 1, further comprising program instructions for reporting completion of operation of the requested relief actuator.

4. The computer program of claim 1, further comprising program instructions for validating the operating parameters.

5. The computer program of claim 1, further comprising program instructions for querying a user for additional operating parameters that are also applied in loading and invoking the requested relief actuator.

6. The computer program of claim 1, wherein the request is received from a user.

7. The computer program of claim 1, wherein the request is received from an error detection monitor such that the request is automated.

8. The computer program of claim 7, wherein the software monitor includes error prediction.

9. The computer program of claim 1, further comprising program instructions for recording the request in a system log.

10. The computer program of claim 9, further comprising program instructions for recording the completion of the operation of the requested relief actuator in the system log.

11. A method for managing errors that occur in a running application where plug-in problem relief actuators are employed, comprising:
    receiving a request including identification of a requested relief actuator;
    reading descriptor data for the requested relief actuator, the descriptor data including operating parameters and environment specifications; and
    invoking the requested relief actuator according to the operating parameters and the environment specifications;
    wherein the requested relief actuator comprises one of a plurality of available relief actuators, each comprising a small plug-in program for mitigating a different software error.

12. The method of claim 11, wherein the plurality of available relief actuators, each for mitigating the different software error comprises one or more functions selected from the group consisting of event completion signaling, subtask termination, subtask resumption, resource release and reserved device release.

13. The method of claim 11, further comprising reporting completion of operation of the requested relief actuator.

14. The method of claim 11, further comprising validating the operating parameters.

15. The method of claim 11, further comprising querying a user for additional operating parameters that are also applied in loading and invoking the requested relief actuator.

16. The method of claim 11, wherein the request is received from a user.

17. The method of claim 11, wherein the request is received from an error detection monitor such that the request is automated.

18. The method of claim 17, wherein the software monitor includes error prediction.

19. The method of claim 11, further comprising the request in a system log.

20. The method of claim 19, further comprising recording the completion of the operation of the requested relief actuator in the system log.

* * * * *